April 18, 1967 R. A. HONSTRATER 3,314,107
EXTRUDER SYSTEM
Filed Aug. 24, 1965 2 Sheets-Sheet 1
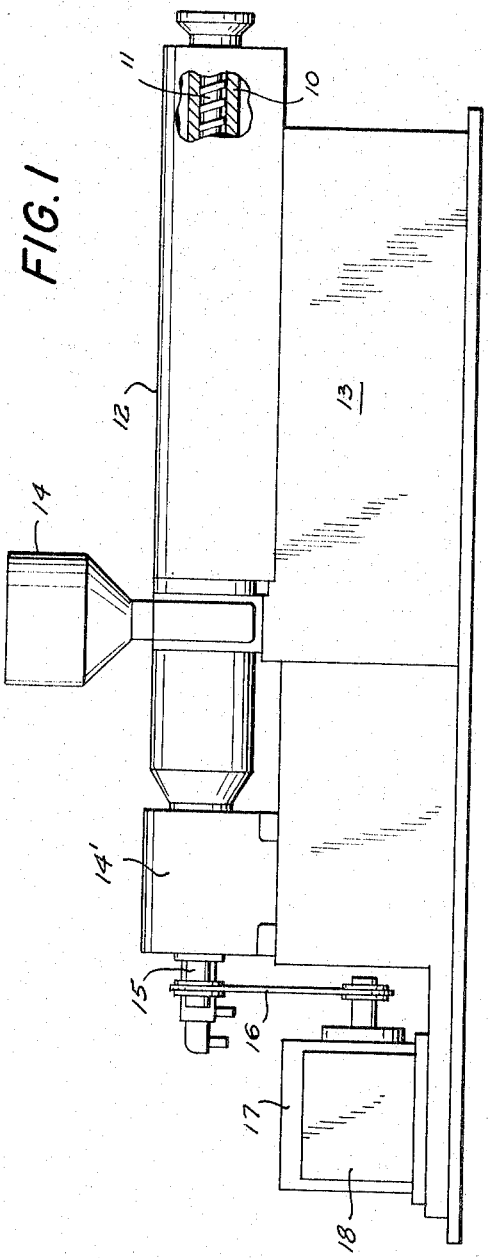
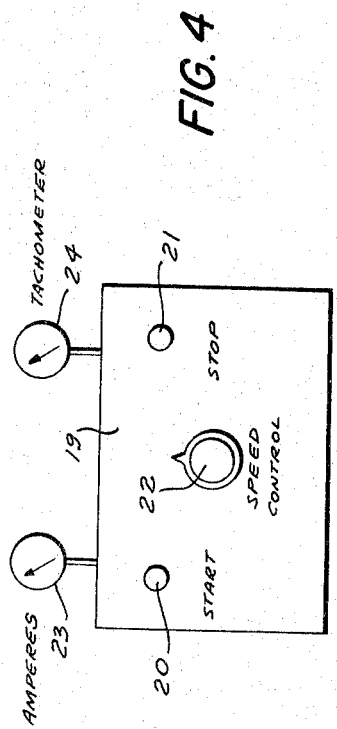
INVENTOR
RICHARD A. HONSTRATER
BY
Pennie, Edmonds, Morton, Taylor & Adams
ATTORNEYS

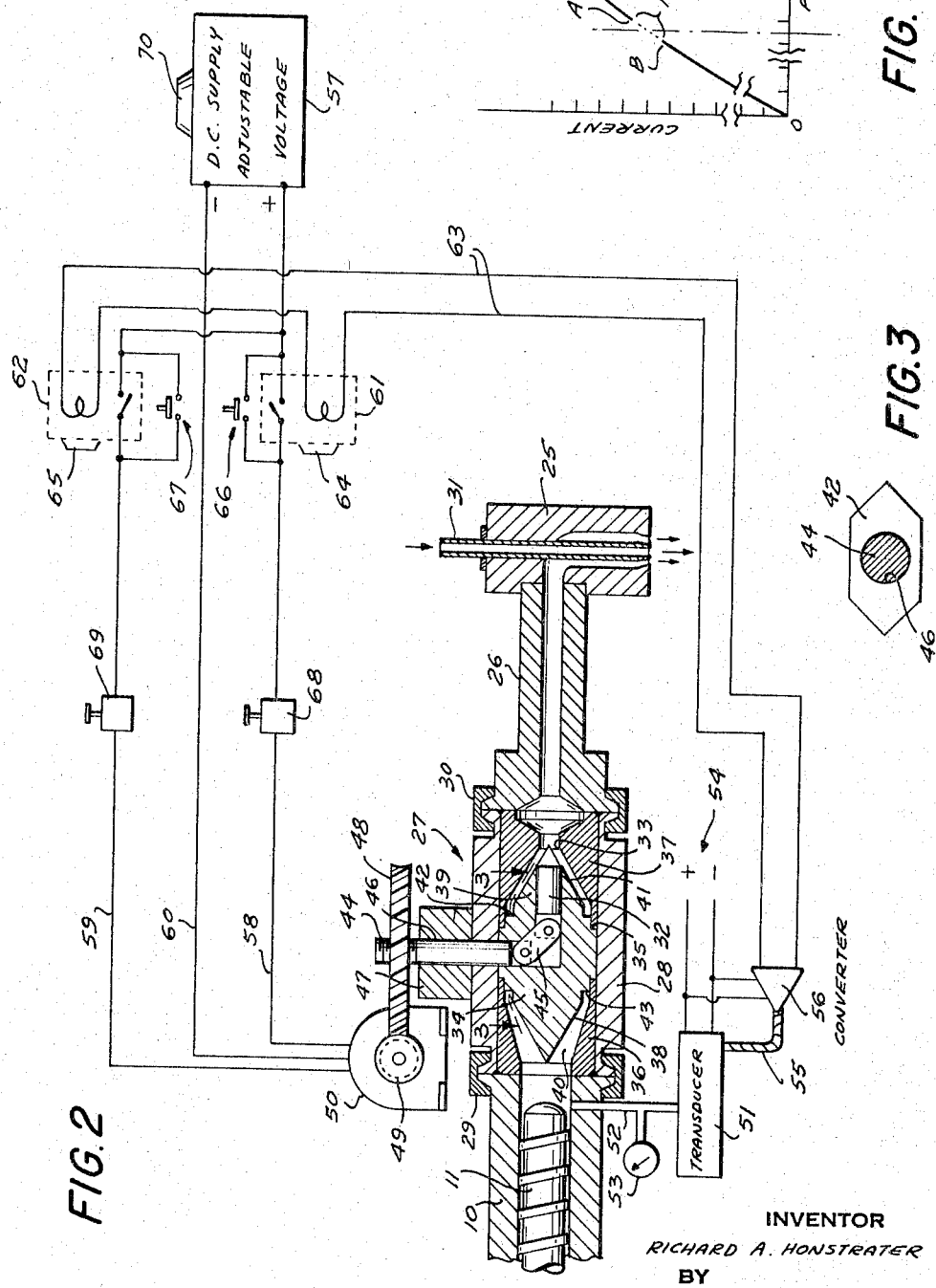

United States Patent Office 3,314,107
Patented Apr. 18, 1967

3,314,107
EXTRUDER SYSTEM
Richard A. Honstrater, Linden, N.J., assignor to Sterling Extruder Corporation, Linden, N.J., a corporation of New Jersey
Filed Aug. 24, 1965, Ser. No. 482,052
1 Claim. (Cl. 18—12)

This invention relates to an improved extruder system for organic plastic material, and the invention is concerned especially with the control or regulation of the pressure of the plastic material as it is delivered to a die head for extruding the material in any desired form.

As is well known the pressure of the plastic material as it is discharged by a screw-type extruder has a tendency to vary on account of the characteristics of this type of extruder. In the molding of certain products such variation in pressure is objectionable, as for example where it is desired to form the plastic into filaments, and especially filaments of very small size.

The purpose of the present invention is to provide automatic control of the pressure of the plastic material melt as it is delivered to the die head by the extruder, and to control such pressure in a precise manner.

In accordance with the invention, a valve is placed in the conduit leading from the discharge end of the extruder to the die head, such valve having a discharge port together with a valve member which is movable toward and from this port to vary the area of discharge as required by the circumstances of the extrusion. This valve is provided with an actuating shaft, and a valve operating device or means is operatively connected to the valve actuating shaft. Pressure responsive means is appropriately associated with the system so as to be responsive to the discharge pressure of the extruder. Also means responsive to variations in such pressure are provided for moving or controlling the valve operating means and cause the valve member to move either toward or away from the valve port and thus maintain the pressure on the plastic material being fed to the die head as nearly constant as possible. The construction of the valve is such that with a given incremental movement of its actuating shaft, corresponding to a given incremental change in pressure, when the valve member is close to the valve port the extent of movement imparted to the valve member will be of microscopic proportions, and vice versa, when the valve member has been moved away from the valve port such incremental movement of the actuating shaft will result in movement of the valve member of substantial proportions.

The invention will be better understood by considering the more detailed description thereof which follows the description of the accompanying drawings.

In these drawings:

FIG. 1 is a diagrammatic side elevation of a screw-type extruder and its power operating mechanism;

FIG. 2 is a diagrammatic vertical section of the discharge end of the extruder, the die head, the interconnecting conduit therebetween and a pressure control valve in such conduit, together with a diagram of connections for the control of this valve;

FIG. 3 is a fragmentary section taken on line 3—3 of FIG. 2;

FIG. 4 is a diagrammatic view of the control mechanism for operating the extruder shown in FIG. 1;

FIG. 5 is a diagram which is useful in connection with the explanation of the control circuitry shown in FIG. 2.

In FIG. 1 there is shown an extruder barrel 10 in which an extruder screw 11 rotates, a casing 12 being provided to enclose the extruder barrel and also a series of electrical heating devices as well as cooling devices, if necessary, neither of these being shown. The whole is supported on a frame or base 13 which rests on the floor. The plastic material is fed to the extruder through a hopper 14 and the rotation of screw 10, together with the additional heat supplied causes the plasticizing of the plastic pellets fed to the hopper and reduces them to a flowable plastic melt which is forced to the right and out of the extruder as will be presently described.

Immediately to the left of the hopper 14 and within housing 12 there are suitable thrust bearings (not shown) to absorb the reaction of the screw operation. Further to the left there is a speed reducer 14, the output shaft of which is connected to rotate the plasticizer screw 11 while the input shaft 15 is driven by a V-belt 16 and suitable pulleys from an electric motor 17. Control mechanism for this motor is provided within a rectangular casing in front of motor 17.

The speed of motor 17 and of extruder screw 11 is controlled by conventional apparatus mounted within a control casing 19 shown in FIG. 4. This control mechanism includes a starting button 20, a stop button 21 and a speed control handle 22. An ammeter 23 indicates the motor current of motor 17 and a tachometer 24 shows the speed of motor 17 or of the extruder screw 11 as desired. This instrument is a voltmeter which is calibrated in revolutions per minute.

Referring now to FIG. 2, there is here shown in vertical central section the discharge end portion of extruder barrel 10 and of extruder screw 11, together with a die head 25 and a conduit 26 joining the extruder to the die head and in which is connected a valve 27. This valve has a cylindrical housing 28 which is connected at its left end to the discharge end of barrel 10, and at its right end to conduit 26. These connections are made by means of conventional connecting members 28 and 29.

It will be understood that die head 25 may be arranged to form any desired type of preform or parison, and that the central tube 31 is for the introduction of pressure fluid for blow molding if desired.

Valve 27 has a cylindrical valve member 32 the right hand portion of which is conical and cooperates with a cylindrical valve port or opening 33. Valve member 32 slides in a cylindrical bore in a valve body member 34, this body member being centrally positioned within the cylindrical housing 28. In order to support body 34 in position it is provided with a cylindrical waist portion 35 having shoulders as indicated at its opposite sides or ends. Waist portion 35 extends continuously around the longitudinal central portion of the valve body and serves to center it in housing 28.

In order to position body 34 lengthwise of housing 28 two insert members 36 and 37 are provided. These inserts are hollow cylindrical members which closely fit the bore of housing 28, and their inner end portions bear against the opposite shoulders of waist portion 35. Inserts 36 and 37 may be welded at their outer ends to valve housing 28 as indicated.

Valve body 34 is a streamlined member and for this reason has conical end portions 38 and 39, the conical end of valve member 32 constituting a continuation of the conical surface of the right-hand conical member 39.

Insert 36 has an inner wall in the form of a truncated cone so as to form with the surface of conical end portion 38, a streamlined entrance passage 40 for the plastic material from the extruder. Insert 37 has an inner wall of similar shape which forms with the surface of conical end portion 39 of the valve body, a streamlined approach passage which converges to the restricted valve opening or port 33 which is formed in the outer portion of this insert 37.

The valve body 34 is supported centrally of the flow passage through the valve formed by the streamlined entrance passage 40 and the approach passage 41 by means of two integral spacer members 42 and 43 diametrically opposite one another at the top and bottom respectively of valve body member 34, the upper spacer 42 being shown in outline in FIG. 3, and the lower spacer member being of similar outline. Spacers 42 and 43 are streamlined at both their leading and trailing ends as shown in FIG. 3.

Valve member 32 is actuated toward and from the valve port 33 by means of an actuating shaft 44 which is arranged for sliding movement at right angles to the valve member. A knuckle member is provided at the inner end of an actuating shaft 44 and a somewhat similar knuckle member on the left-hand end of valve 32. These two knuckle portions are interconnected by means of an angular link member 45 which is connected to the knuckle members by means of the two crosspins shown in FIG. 2.

The edges of the knuckle member on valve 32 bear upon a flat surface within valve body member 34 and to the left of the valve member. The knuckle member on the lower end of actuating shaft 44 together with the rounded upper end of link 45 bear against another flat surface at right angles to the first which is in alignment with the left-hand perimeter of the bore 46 in which actuating member 44 slides. This bore is formed, at its lower portion in the upper spacer member 42, then, in the wall of housing 28, and finally in an extension member 47 which is mounted in any suitable manner on the exterior of housing 28 and fixedly secured thereto.

As actuating member 44 moves inwardly to advance the valve member 42 towards port 33, the axis of link 45 approaches parallelism with the axis of valve 32. Hence a given incremental movement of shaft 44 caused by a given incremental change in pressure, will produce almost microscopic movement of the valve member when it is in the vicinity of port 33, but as shaft 44 is actuated in the opposite direction the angularity of the axis of link 44 increases and consequently the extent of movement of valve member 32 increases for the same incremental movement of shaft 44 and change in pressure.

The axial movement of actuating shaft 44 is produced by means of a worm gear which has a threaded engagement with the surface of shaft 44 and is also provided with means (not shown) for preventing sidewise or vertical movement. Worm gear 48 is driven by means of a worm 49 on the shaft of a small D.C. motor 50. The automatic control of the operating motor 50 for the purpose of regulating the pressure of the plastic melt flowing through conduit 26 to the die head 25 by automatic adjustment of valve member 32 will now be described.

A transducer 51 for changing the pressure of the melt into an electrical effect, such as an electromotive force, is provided and a tube 52 connects the interior of the discharge end of the extruder barrel 10 with the transducer. A pressure gage 53 is arranged on this tube to indicate the p.s.i. of the plastic melt as it enters valve 27. This gage ordinarily has a range from 1000 to 5,000 p.s.i. Corresponding to this range transducer 51 produces an E.M.F. of up to 3 millivolts. Such m.v. signal is impressed upon a Wheatstone bridge within the transducer whose excitation voltage is 6 volts D.C. which is received from an appropriate source 54. The Wheatstone bridge circuit is continued through a cable 55 to a converter 56 which converts the m.v. signal to a proportional 10–50 milliampere D.C. signal. Such output signal corresponds to the 1000–5000 p.s.i. range of transducer 51.

Electrical energy for operating the valve adjusting motor 50 is obtained from a source of D.C. supply 57. Motor 50 has three conductors, conductor 58 for operating the motor in one direction and conductor 59 for operating it in the opposite direction of rotation. The third conductor 60 is the return conductor to supply source 57. Relays 61 and 62 are provided to connect one side of the voltage source 57 to conductors 58 and 59 respectively, the contacts of these relays being normally open as shown. The operating coils of relays 61 and 62 are connected in series and through conductors 63 to converter 56. Relay 61 by means of a knob 64 can be adjusted to cause the closing of its contacts at different values of the milliampere current from converter 56. Relay 62 may be similarly adjusted by means of knob 65.

The arrangement is such that by properly adjusting the two relays 61 and 62 motor 50 can be energized automatically through variation in the extruder pressure to adjust valve member 32 either towards or away from the valve port or opening 33 so as to maintain the pressure in conduit 26 and die head 25 constant within close limits, as well be presently described.

The valve adjusting motor 50 can be operated manually either to increase or decrease the pressure by means of the push-buttons 66 and 67. Also the rate of closing or opening of the valve may be adjusted by means of the manual speed control devices 68 and 69, and the rate of operation of motor 50 in both directions can be simultaneously adjusted by means of knob 70 on the adjustable voltage supply 57.

Referring now to FIG. 5, in connection with FIGS. 1, 2 and 4, a portion of the pressure versus current curve of the extruder system is shown, referring to the pressure produced by the screw extruder and the milliampere output from converter 56. Assuming that it is desired to maintain the pressure at the die head 25 between the limits indicated by the zone N, relay 61 will be adjusted so that its contacts will be closed when the current falls to the lower limit B of this zone, and relay 62 will be adjusted so that its contacts will close when the current reaches the upper limit of zone N indicated by reference character A.

The extruder screw 11 is started and rotated by means of motor 17 and the control devices within casing 19, through turning knob 22, until the tachometer 24 indicates a predetermined speed of rotation and the desired approximate pressure of the melt is indicated on the pressure gage 53. Valve 27 is adjusted by means of the push buttons 66 and 67 to retract valve member 32 from port 33 to provide the desired flow of the plastic melt. Thereupon the operation of the apparatus is continued automatically by the mechanism described, and shown in FIG. 2.

Assuming that the extruder has been brought up to a speed which will produce a pressure which is within the zone N of FIG. 5, the extruding operation will continue until, for example, for some reason, the extrusion pressure either drops below the point B or exceeds the point A. Assuming that the pressure drops to the point B, the contacts of relay 61 will then close and motor 50 will operate to move valve member 32 in the direction to open the valve farther and thus increase the pressure on die head 25. As soon as the pressure rises back to the point B, the contacts of relay 61 will re-open. The operation may then continue until the pressure again drops to the point B, or rises to the point A at the upper end of zone N. At this point the contacts of relay 62 will be closed thereby operating motor 50 in the opposite direction and moving valve member 32 toward the port 33 so as to reduce the pressure of the melt entering die head 25. When the pressure has fallen back to that designated by point A, relay 62 contacts will reopen. Automatic operation in this manner may be continued indefinitely.

I claim:

In an extruder system for organic plastic material including a screw type extruder, a die head, a conduit interconnecting the discharge end of the extruder and the die head, a valve in the conduit for controlling the pressure of the material supplied to the die head, the valve having a discharge port, a valve member movable toward and from said port, an actuating shaft therefor extending from the valve housing, valve operating means operatively connected to the actuating shaft, pressure responsive means responsive to the pressure of the material at the discharge end of the extruder, means actuated by the pressure responsive means for controlling the valve operating means, and connecting mechanism between the actuating shaft and the valve member arranged to produce a much smaller movement of the valve for a given incremental movement of the actuating shaft, corresponding to a given incremental change in pressure, when the valve member is close to the valve port than when the valve member is at a distance from said port.

References Cited by the Examiner

UNITED STATES PATENTS

| | | | |
|---|---|---|---|
| 2,747,224 | 5/1956 | Koch et al. | |
| 3,111,707 | 11/1963 | Buckley | 18—2 |
| 3,217,360 | 11/1965 | Mason et al. | 18—14 |
| 3,241,191 | 3/1966 | Nouel | 18—30 |
| 3,241,192 | 3/1966 | Nouel | 18—30 |

FOREIGN PATENTS 558,049  11/1957  Belgium.

WILLIAM J. STEPHENSON, *Primary Examiner.*

J. SPENCER OVERHOLSER, *Examiner.*